United States Patent [19]

Meyer

[11] 4,069,384
[45] Jan. 17, 1978

[54] CARBOXYL TERMINATED POLYDIENES

[75] Inventor: Glen E. Meyer, Akron, Ohio

[73] Assignee: The Goodyear Tire & Rubber Company, Akron, Ohio

[21] Appl. No.: 521,994

[22] Filed: Nov. 8, 1974

Related U.S. Application Data

[63] Continuation of Ser. No. 211,124, Dec. 22, 1971, abandoned.

[51] Int. Cl.$^2$ ............................................. C07C 67/08
[52] U.S. Cl. ..................................... 560/91; 560/84; 560/88; 560/120; 560/194; 560/196; 560/198
[58] Field of Search ........... 260/475 D, 485 G, 468 G

[56] References Cited

FOREIGN PATENT DOCUMENTS 4,641,618  12/1971  Japan ..................................... 260/468
4,008,335  4/1965  Japan ..................................... 260/485

*Primary Examiner*—Robert Gerstl
*Attorney, Agent, or Firm*—F. W. Brunner; H. C. Young, Jr.

[57] ABSTRACT

Carboxyl terminated polymers prepared by reacting a cyclic anhydride with a liquid polymeric hydroxyl terminated polymer selected from polyethers, polydienes, and copolymers of the dienes with styrene or acrylonitrile in the presence of a catalyst selected from quaternary ammonium salts and from halogen acid salts of amines. The carboxyl terminated polymers can be used as flexibilizers in epoxy resins.

4 Claims, No Drawings

CARBOXYL TERMINATED POLYDIENES

This is a continuation, of application Ser. No. 211,124 filed 12-22-71 now abandoned.

This invention relates to carboxyl terminated polyethers, polydienes and diene copolymers and to a method for their preparation. This invention more particularly relates to carboxyl terminated polyethers, polydienes and diene copolymers prepared by reacting liquid hydroxyl terminated polyether, polydiene or diene copolymer precursors with a cyclic anhydride in the presence of specific types of discovered catalysts.

The difficulty and expense of preparing carboxyl terminated polymers has been a serious drawback to their preparation and commercial use. Similar hydroxyl terminated polymers are generally considerably more readily accessible and more easily prepared. Thus, a simple, low cost method for converting the hydroxyl terminated polymers to carboxyl terminated polymers is highly desirable.

In accordance with this invention, it has been discovered that carboxyl terminated polymeric materials can be prepared by reacting cyclic anhydrides with hydroxyl terminated polymers, which are liquid at about 30° C., selected from polyethers, polydienes or copolymers of dienes with monomers selected from styrene and acrylonitrile in the presence of a catalyst selected from quaternary ammonium salts and halogen acid salts of amines.

In the practice of this invention, the liquid polymeric hydroxyl terminated polyether, polydiene and diene copolymer precursors for the carboxyl terminated polymers typically have a molecular weight in the range of about 400 to about 30,000, preferably from about 800 to about 5,000, and a viscosity at 30° C. in the range of about 2 to about 10,000, preferably about 5 to about 500 poises.

The liquid hydroxyl terminated polydienes and diene copolymers may have a hydroxyl functionality in the range of about 1.8 to about 4 and preferably from about 2 to about 2.6. Representative of the various polydienes are the hydroxyl terminated polymers of 1,3-butadiene and isoprene and representative of diene copolymers are copolymers of either 1,3-butadiene or isoprene with vinyl monomers selected from styrene and acrylonitrile with a mole ratio of diene to vinyl monomer in the range of about 60:30 to about 85:15.

The liquid hydroxyl terminated polyethers may have a hydroxyl functionality in the range of 2 to 4, although their hydroxyl functionality is typically 2. Representative of the various hydroxyl terminated polyethers, sometimes referred to as polyether polyols, are polymers and copolymers of alkylene oxides having 2 to 4 carbon atoms such as polyethylene oxide, polypropylene oxide, polytetrahydrofuran, copolymers of ethylene oxide and propylene oxide and copolymers of tetrahydrofuran with ethylene oxide or propylene oxide.

For the practice of this invention, the cyclic anhydrides typically have a molecular weight of in the range of from about 98 to about 300. Representative of such cyclic anhydrides are maleic, chlorendic, phthalic, nadic methyl and succinic anhydride and succinic anhydride substituted with alkyl and alkylene radicals having from 2 to 16 carbon atoms such as butyl, octyl and tetrapropenyl radicals.

The various quaternary ammonium and amine salts which have been discovered to be catalysts for this invention typically have a molecular weight of from about 65 to about 400. Generally they have the following structure:

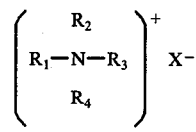

where N is a pentavalent nitrogen radical; X is a halogen radical selected from chloride and bromide radicals; $R_1$, $R_2$ and $R_3$ can be hydrogen; $R_1$, $R_2$, $R_3$ and $R_4$ can be individually selected from saturated alkyl radicals having from 1 to 10 carbon atoms, cycloalkyl radicals having from 5 to 10 carbon atoms, aralkyl radicals having from 7 to 10 carbon atoms, and phenyl radicals; where $R_1$ and $R_2$ can be alkylene radicals having from 4 to 9 carbon atoms combined to form a heterocyclic ring with the nitrogen and where $R_1$, $R_2$ and $R_3$ can be alkenylene radicals having 5 to 10 carbon atoms combined to form a heterocyclic aromatic ring with the nitrogen.

Representative of the various saturated alkyl radicals are methyl, ethyl, propyl, butyl, pentyl, hexyl, heptyl, octyl, nonyl, dodecyl and stearyl radicals. Representative of the various aralkyl radicals are benzyl, 2-phenylethyl and xylyl radicals. Representative aryl radicals are phenyl, methyl phenyl and dimethyl phenyl radicals.

Representative of the various cycloalkyl radicals are cyclopentyl and cyclohexyl radicals.

Representative of alkylene and alkenylene radicals combined to form the heterocyclic ring with the nitrogen are the piperidene and the pyridine and quinoline radicals, respectively.

Representative of the various quanternary ammonium salts are:
distearyldimethylammonium chloride
tetrapentylammonium chloride
tetrapentylammonium bromide
trioctylpropylammonium chloride
trioctylpropylammonium bromide
cetyldimethylbenzylammonium chloride
n-alkyldimethylbenzylammonium chloride
myristyldimethylbenzylammonium chloride
tetramethylammonium chloride
tetramethylammonium bromide
tetraethylammonium chloride
cetyltrimethylammonium chloride
laurylpyridinium chloride
laurylpyridinium bromide
cetylpyridinium chloride
cetylpyridinium bromide
n-alkyldimethylnaphthylmethyl ammonium chloride
stearyldimethylbenzylammonium chloride
diisobutylphenoxyethoxyphenyl-dimethylbenzylammonium chloride
diisobutylcresoxyethoxyethyl-dimethylbenzylammonium chloride The preferred quaternary ammonium salts are cetyldimethylbenzylammonium chloride, tetraethylammonium chloride, and laurylpyridinium chloride.

Representative of the various halogen acid salts of amines are:
benzylamine hydrobromide
benzylamine hydrochloride cyclohexylamine hydrochloride
triethylamine hydrochloride
tribenzylamine hydrochloride
tribenzylamine hydrobromide
triethylamine hydrobromide
trimethylamine hydrochloride
trimethylamine hydrobromide
ethylamine hydrochloride
ethylamine hydrochlobromide The preferred halogen acid salts of amines are tribenzylamine hydrochloride and triethylamine hydrobromide.

The process of this invention is typically conducted by reacting a mixture of the hydroxyl terminated polydiene or polyether with the cyclic anhydride in the presence of the catalysts at a temperature from about 50° C. to about 150° C. and preferably from about 80° C. to about 130° C. The reaction can be conducted under atmospheric, greater than atmospheric or below atmospheric pressure, although the autogeneous pressure of the reaction system is generally satisfactory.

Generally from about 0.9 to about 2 moles, and preferably from about 1 to about 1.2 moles of the cyclic anhydride is used per hydroxyl equivalent of the hydroxyl terminated polydiene or polyether. Various amounts of the catalyst can be used, depending upon the amount of reaction promotion desired. However, it is usually preferred that from about 0.3 to about 10 and more preferably from about 1 to about 5 weight percent of the catalyst based on the polymer is used. The higher molecular weight catalysts are normally preferred because of their higher solubility in the reaction mixture.

The reaction is usually conducted from about 10 minutes to about 10 hours under these conditions, although with some of the reaction systems a satisfactory conversion to the carboxyl terminated polydiene or polyether, such as from about 95 to about 100 percent conversion, can be reached during a period of from about 10 to about 50 minutes.

If the reaction is carried out in the absence of solvent, the resulting carboxyl terminated polydiene or polyether is ready for use at the end of the reaction such as for use in epoxy resins to add a degree of flexibility. If solvent is used, it may be removed from the product by an appropriate distillation process under vacuum or at about atmospheric pressure.

The practice of this invention is further illustrated by reference to the following example which is intended to be representative rather than restrictive of the scope of the invention. Amounts are by weight unless otherwise indicated.

EXAMPLE I

Carboxyl terminated polymers were prepared by reacting cyclic anhydrides with polymeric polyols in the presence of the nitrogen catalysts of this invention with and without solvents. The reactions conducted with solvents are identified herein as Experiments A-Q and the reactions conducted without solvents are identified as Experiments AA-GG.

For the experiments conducted with solvents, anhydride-catalyst solutions, when a catalyst was used, were prepared in appropriate concentrations so that they could easily be transferred by pipette to a reactor. Weighed amounts of polyol, usually about 10 grams, were charged to individual 4-ounce reactor bottles and the prepared anhydride-catalyst solution was added to each with agitation to form a homogeneous cement. The reactor bottles were sealed and heated in a water bath or air oven at a designated temperature for a designated length of time. The mixtures in the individual reactor bottles were titrated with a standard base such as 0.1 N potassium hydroxide in a solution of water and tetrahydrofuran in a 50:50 volume ratio and the extent of the reaction, expressed as a percent, was calculated as follows:

$$2A\text{-}C/B \times 100 = \text{percent reaction}$$

where
A = moles anhydride charged
B = equivalents of hydroxyl groups charged
C = equivalents of carboxylic acid found by titration of product.

For the experiments conducted without a solvent, the polyol, normally 150 grams, was placed in a 250 ml round bottom flask which was fitted with a mechanical stirrer. Measured amounts of catalyst and cyclic anhydride were added to the flask and vigorous stirring was begun. The sealed flask was immersed in a controlled temperature oil bath. Samples, about 10–15 grams, were taken from the reaction mixture at regular intervals in order to measure the extent of reaction. This was done by dissolving the samples in tetrahydrofuran, titrating with a standard base, such as 0.1 N potassium hydroxide, and the extent of reaction calculated.

In Table 1 is shown experimental conditions and results for the reactions conducted with a solvent. The principal solvents used were dimethylformamide (DMF), methyl ethyl ketone (MEK) and dioxane. In Table 2 is shown such information for reactions conducted without a solvent. In Table 3 are identified the various catalysts used.

Table 1

| | REACTIONS CONDUCTED WITH SOLVENTS | | | | | | |
|---|---|---|---|---|---|---|---|
| | | | | | | Percent Reaction | |
| (Experiment) Polyol | Anhydride (moles/OH) | Catalyst (Percent) | Time (hr) | Temp (° C) | Solvent | w/Cat | w/o Cat |
| (A) Polypropylene Oxide[1] | succinic (1.2) | (a)/(2) | 5.5 | 84 | DMF | 43.2 | 11.2 |
| (B) Polypropylene Oxide[1] | succinic (1.2) | (b)/(2) | 5.5 | 84 | DMF | 38.5 | 11.2 |
| (C) Poly THF[2] | succinic (1.2) | (c)/(2) | 5 | 80 | MEK | 52.3 | 9.4 |
| (D) Poly THF[2] | succinic (1.2) | (c)/(2) | 4 | 120 | dioxane | 92.0 | 61.5 |

Table 1-continued

REACTIONS CONDUCTED WITH SOLVENTS

| (Experiment) Polyol | Anhydride (moles/OH) | Catalyst (Percent) | Time (hr) | Temp (° C) | Solvent | Percent Reaction w/Cat | Percent Reaction w/o Cat |
|---|---|---|---|---|---|---|---|
| (E) Poly THF[3] | succinic (1.1) | (d)/(4) | 4 | 80 | DMF | 22.2 | 16.0 |
| (F) Poly THF[3] | succinic (1.1) | (e)/(4) | 4 | 80 | DMF | 26.3 | 16.0 |
| (G) Poly THF[3] | succinic (1.1) | (f)/(2) | 4 | 80 | DMF | 36.0 | 16.0 |
| (H) Poly THF[3] | succinic (1.1) | (g)/(2) | 2 | 120 | DMF | 67.8 | 32.0 |
| (I) Poly THF[3] | succinic (1.1) | (h)/(2) | 2 | 124 | DMF | 65.0 | 32.0 |
| (J) Poly THF[3] | succinic (1.2) | (i)/(2) | 4 | 120 | DMF | 84.7 | 65.4 |
| (K) Poly THF[3] | succinic (1.2) | (j)/(2) | 4 | 120 | DMF | 84.7 | 65.4 |
| (L) Poly THF[3] | succinic (1.2) | (k)/(2) | 4 | 120 | DMF | 90.6 | 65.4 |
| (M) Poly THF[3] | succinic (1.2) | (l)/(2) | 4 | 120 | DMF | 83.2 | 65.4 |
| (N) Poly THF[3] | succinic (1.2) | (m)/(2) | 4 | 120 | DMF | 89.0 | 65.4 |
| (O) Poly THF[3] | succinic (1.2) | (n)/(2) | 4 | 120 | Dioxane | 87.0 | 17.7 |
| (P) Poly THF[3] | succinic (1.2) | (o)/(2) | 4 | 120 | Dioxane | 89.5 | 17.7 |
| Poly THF[3] | succinic (1.2) | (p)/(2) | 3 | 120 | Dioxane | 99.5 | 13.8 |

[1]Polypropylene oxide of about 500 equivalent weight
[2]Polytetrahydrofuran of about 570 equivalent weight
[3]Polytetrahydrofuran of about 1040 equivalent weight Table 2

ESTERIFICATION OF POLYOLS WITHOUT SOLVENT

| (Experiment) Polyol | Anhydride (moles/OH) | Catalyst (Percent) | Time (hr) | Temp (° C) | Percent Reaction w/Cat | Percent Reaction w/o Cat |
|---|---|---|---|---|---|---|
| (AA) Poly THF[3] | succinic (1.2) | (p)/(2) | 0.5 | 125 | 97.7 | 41.2 |
| (BB) Poly THF[3] | phthalic (1.1) | (p)/(2) | 0.5 | 125 | 83.0 | 9.5 |
| (CC) Polybutadiene[4] | succinic (1.1) | (p)/(2) | 1.0 | 125 | 99.5 | 92.5 |
| Polybutadiene[4] | succinic (1.1) | (p)/(2) | 3.0 | 125 | 100.0 | 96.7 |
| (DD) Polyisoprene[5] | phthalic (1.1) | (g)/(2) | 1.0 | 100 | 95.0 | 28.0 |
| (EE) Polyisoprene[5] | phthalic (1.1) | (p)/(2) | 2.0 | 80 | 94.5 | (*) |
| (FF) Polybutadiene[6] | phthalic (1.5) | (g)/(2) | 4.0 | 80 | 100.0 | (*) |
| (GG) Polyisoprene[5] | Tetapropenylsuccinic (1.2) | (p)/(2) | 16.0 | 50 | 53.5 | 34.9 |

[3]Polytetrahydrofuran of about 1040 equivalent weight
[4]Polybutadiene of about 2460 equivalent weight
[5]Polyisoprene of about 2320 equivalent weight
[6]Polybutadiene of about 1370 equivalent weight
(*)Phthalic anhydride did not completely dissolve Table 3

CATALYSTS USED a = Benzylamine hydrochloride
b = Cyclohexylamine hydrochloride
c = Laurylpyridinium chloride
d = Triethylamine hydrochloride
e = Tetraethylammonium iodide
f = Distearyldimethylammonium chloride
g = Diisobutylphenoxyethoxyphenyldimethylbenzylammonium chloride
h = Diisobutylcresoxyethoxyethyldimethylbenzylammonium chloride
i = Tetrapentylammonium chloride
j = Tetrapentylammonium bromide
k = Trioctylpropylammonium chloride
l = Trioctylpropylammonium bromide
m = n-Alkyldimethylbenzylammonium chloride
n = Myristyldimethylbenzylammonium chloride
o = n-Alkyldimethylnaphthylmethylammonium chloride
p = Cetyldimethylbenzylammonium chloride Thus, these experiments of Example 1 clearly show the catalytic effect of the presence of the various quaternary ammonium salts and halogen acid salts of amines when reacting the cyclic anhydrides of dicarboxylic acids with the hydroxyl terminated polymers. It can easily be seen in these experiments that the reaction of the cyclic anhydride with the hydroxyl terminated polymer proceeded to a substantially greater percent completion in the presence of the catalyst under the same reaction conditions. It was not uncommon to find the extent of reaction to be a factor of 3 times greater when using the catalyst of this invention.

While certain representative embodiments and details have been shown for the purpose of illustrating the invention, it will be apparent to those skilled in this art that various changes and modifications may be made therein without departing from the spirit or scope of the invention.

We claim:

1. A method of preparing a carboxyl terminated polymer from a hydroxyl terminated polymer which method comprises essentially reacting, at a temperature in the range of about 50° to about 150° C., (I) a cyclic anhydride selected from at least one of maleic, chlorendic, phthalic, nadic methyl, and tetrapropenyl, succinic and succinic anhydride substituted with radicals selected from alkyl and alkylene radicals having 2 to 16 carbon atoms with (II) a hydroxyl terminated polymer having a molecular weight in the range of about 400 to about 30,000 and a viscosity at 30° C. of about 2 to about 10,000 poises selected from at least one of (A) polydienes having a hydroxyl functionality in the range of about 2 to about 4 selected from polymers of 1,3-butadiene or isoprene, and copolymers of 1,3-butadiene or isoprene with styrene or acrylonitrile and (B) polyethers having a hydroxyl functionality in the range of about 1.8 to about 4 selected from polyethylene oxide, polypropylene oxide, copolymers of ethylene oxide and propylene oxide, polytetrahydrofuran, and copolymers of tetrahydrofuran with ethylene oxide or propylene oxide in the presence of (III) a catalyst selected from at least one of (A) quaternary ammonium salts and (B) halogen-acid salts; where the halogen-acid salts of amine are selected from benzylamine hydrobromide, benzylamine hydrochloride, cyclohexylamine hydrochloride, triethylamine hydrochloride, tribenzylamine hydrochloride, tribenzylamine hydrobromide, triethylamine hydrobromide, trimethylamine hydrochloride, trimethylamine hydrobromide, ethylamine hydrochloride and ethylamine hydrobromide, and where the quaternary ammonium salts are selected from:

distearyldimethylammonium chloride,
tetrapentylammonium chloride,
tetraphenylammonium bromide,
trioctylpropylammonium chloride,
trioctylpropylammonium bromide,
cetyldimethylbenzylammonium chloride,
n-alkyldimethylbenzylammonium chloride,
myristyldimethylbenzylammonium chloride,
tetramethylammonium chloride,
tetramethylammonium bromide,
tetraethylammonium chloride,
cetyltrimethylammonium chloride,
laurylpyridinium chloride,
laurylpyridinium bromide,
cetylpyridinium chloride, cetylpyridinium bromide,
n-alkyldimethylnaphthylmethylammonium chloride,
stearyldimethylbenzylammonium chloride,
diisobutylphenoxyethoxyphenyl-dimethylbenzylammonium chloride,
diisobutylcresoxyethoxyethyl-dimethylbenzylammonium chloride.

2. The method of claim 1 where said hydroxyl terminated polymers have a molecular weight in the range of about 800 to about 5000 and a viscosity at 30° C. in the range of about 5 to about 500 poises selected from (A) polydienes and diene copolymers having a hydroxyl functionality of about 2 to about 2.6 selected from polymers of 1,3-butadiene and isoprene and their copolymers and with styrene or acrylonitrile monomers with a mole ratio of diene to said monomer of about 60:30 to about 85:15 and from (B) polyethers having a hydroxyl functionality of 2 selected from polyethylene oxide, polypropylene oxide, polytetrahydrofuran and copolymers of tetrahydrofuran with ethylene oxide or propylene oxide.

3. The method of claim 1 which comprises reacting from about 0.9 to about 2 moles of the cyclic anhydride per hydroxyl equivalent of the said hydroxyl terminated polymer in the presence of from about 0.3 to about 10 weight percent of the catalyst at a temperature in the range of about 50° to about 150° C.

4. The method of claim 1 which comprises essentially of reacting (I) said cyclic anhydride with (II) at least one of said hydroxyl terminated polymers of 1,3-butadiene or isoprene, and copolymers of 1,3-butadiene or isoprene, with styrene or acrylonitrile in the presence of (III) said catalyst.

* * * * *